United States Patent [19]

Harris

[11] 3,719,543

[45] March 6, 1973

[54] ELECTROACOUSTIC MEANS FOR SEPARATION OF GLUED JOINTS

[76] Inventor: Arthur M. Harris, 135 Southwood Road, Fairfield, Conn.

[22] Filed: Sept. 3, 1968

[21] Appl. No.: 767,538

[52] U.S. Cl..................................156/584, 156/73
[51] Int. Cl.............................................B32b
[58] Field of Search ..156/344, 73, 584, 580; 29/427; 134/1

[56] References Cited

UNITED STATES PATENTS

| | | | |
|---|---|---|---|
| 2,363,442 | 11/1944 | Scott | 156/584 |
| 2,633,894 | 3/1953 | Carwile | 156/73 |
| 2,675,051 | 4/1954 | Schnebelen | 156/584 |
| 2,724,666 | 11/1955 | Myers | 156/73 |
| 2,948,059 | 8/1960 | Bodine | 29/427 |
| 3,101,404 | 8/1963 | Hill | 156/73 |
| 3,348,640 | 10/1967 | Thompson et al. | 156/344 |
| 3,365,349 | 1/1968 | Daniels et al. | 156/580 |
| 3,401,446 | 9/1968 | Obeda et al. | 156/344 |
| 3,464,102 | 9/1969 | Soloff | 156/580 |
| 3,483,066 | 12/1969 | Harris et al. | 156/73 |

Primary Examiner—Samuel Feinberg
Attorney—H. Gibner Lehmann

[57] ABSTRACT

A method and means for separating glued joints by subjecting at least one of the joined members to ultrasonic vibrations through either direct contact with an electroacoustic transducer, or else indirect contact therewith through a liquid, gaseous or solid medium. The application of the vibrations may be accompanied by a pulling force, exerted as by a suction applied to the joined member.

9 Claims, 14 Drawing Figures

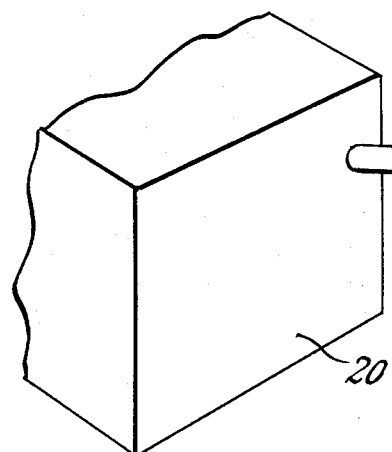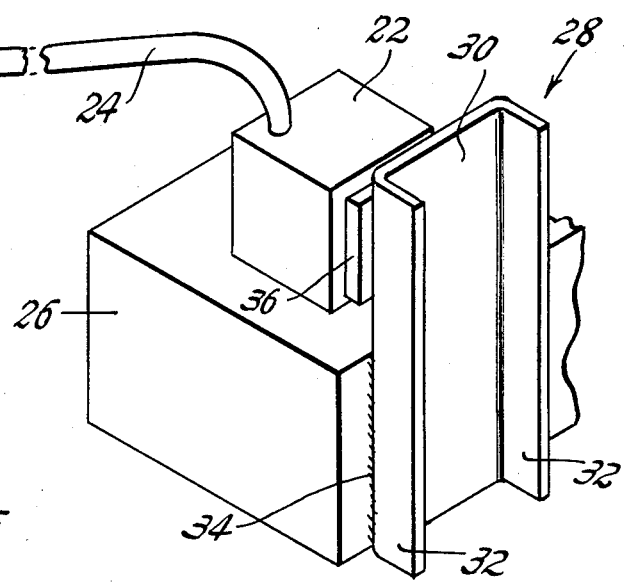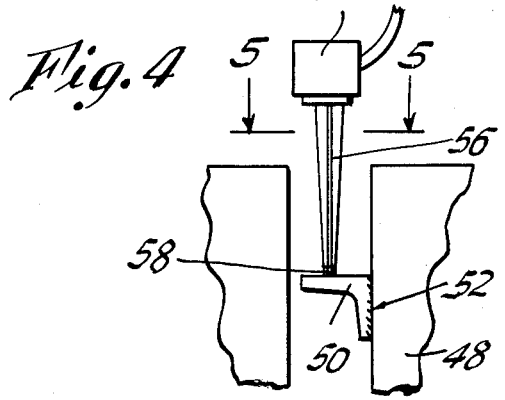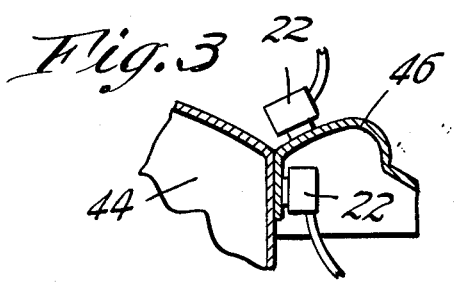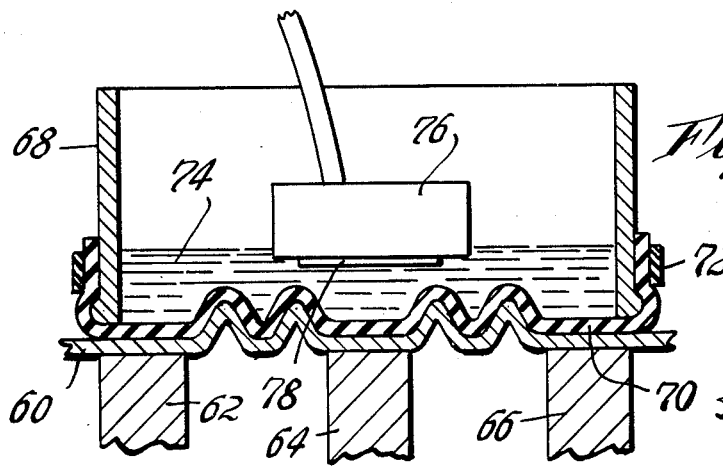

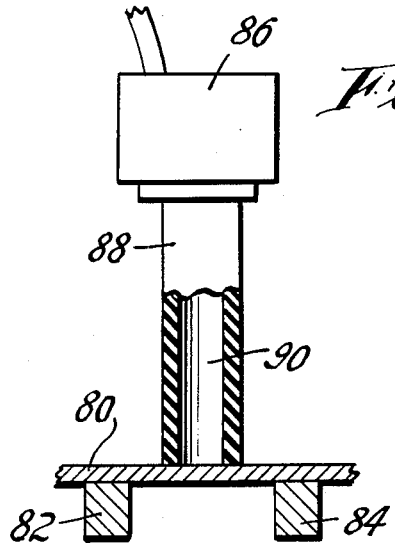
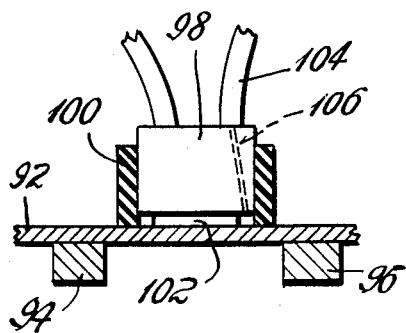
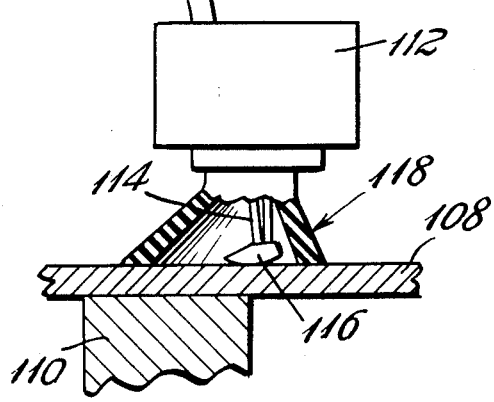
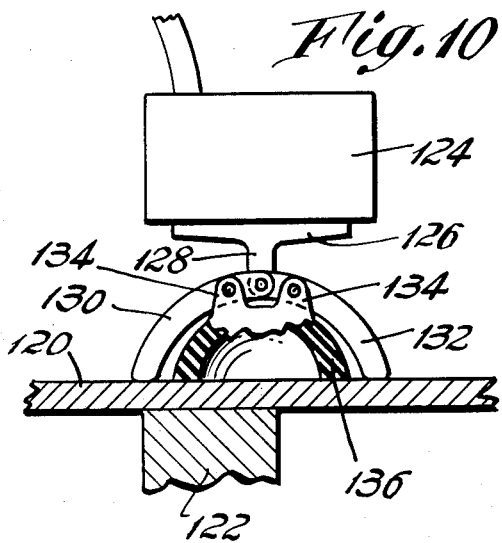
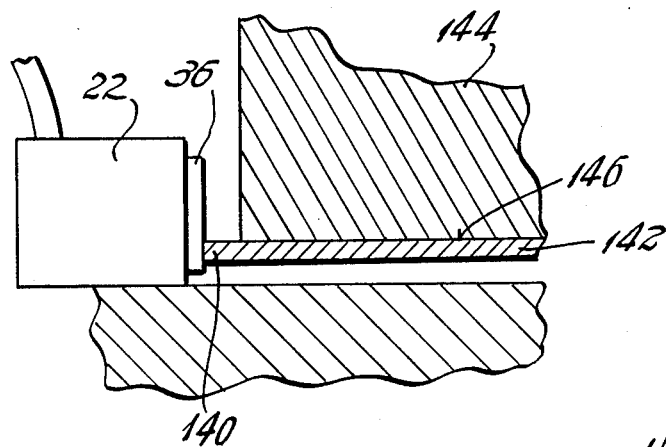

ELECTROACOUSTIC MEANS FOR SEPARATION OF GLUED JOINTS

BACKGROUND

This invention relates to the separation of members which have been glued or cemented together, and more particularly to the undoing of the glued or cemented joint by use of vibrations in the range of ultrasonics.

Heretofore parts have been generally joined by gluing or cementing where the intention was to have the joining continue indefinitely, as a permanent fastening of the parts. Any failure or ungluing of the joint was unintentional and undesirable. If by some circumstance in the past it became necessary to separate glued parts, recourse was had to soaking of the parts in a solvent that acted on the glue, or to heating the parts to soften the glue. This procedure was time-consuming and not always effective. If the parts were large or heavy, there was difficulty in the handling and size of equipment necessary. In addition to this the parts could be damaged by the separating operation, or disfigured.

With the advent or more sophisticated glues such as the epoxy cements, the permanence of the joint was insured to a greater extent, but by the same token any separation of the glued parts was often defeated.

It has been proposed to now join parts much more extensively than in the past, with epoxy and like resinous cements, and particularly to join large members such as aircraft panels, automobile fenders, guards, body parts and the like. However, in the event of collision damage, the separation of the parts thus joined presents a problem.

SUMMARY

The above drawbacks and disadvantages of prior methods and means for separating glued or cemented parts are obviated by the present invention, and one object of the invention is to provide a novel and improved method and apparatus for simply, quickly and effectively ungluing or separating such parts.

Another object of the invention is to provide an improved method and apparatus as above, wherein the parts being separated can have a pulling force exerted on them simultaneously, wherein the parts are not damaged, wherein parts having a wide variety of shapes, sizes and masses may be readily handled, and wherein situations can be coped with, having parts which are relatively inaccessible.

Other features and objects reside in the safety of the method and apparatus, convenience of use, lack of noise, lack of weight and cumbersomeness of the apparatus, and economies which may be effected thereby.

Still other features and advantages will hereinafter appear.

In the drawings:

FIG. 1 is a diagrammatic representation of one method and type of apparatus for effecting ungluing of two glued or cemented parts.

FIG. 2 is a diagrammatic representation showing the method and apparatus applied to workpieces different from those of FIG. 1.

FIG. 3 is a representation showing the method and apparatus applied to the body and fender of an automobile.

FIG. 4 shows the method and apparatus applied to a workpiece which is relatively inaccessible.

FIG. 5 is a fragmentary section taken on line 5—5 of FIG. 4.

FIG. 6 is a representation of an apparatus and method by which vibrations are imparted to an irregular-shaped workpiece through a body of liquid.

FIG. 7 is a diagrammatic representation of the method and apparatus, wherein the ultrasonic vibrations are transmitted to the workpiece through a column of air.

FIG. 8 is a diagrammatic representation of a method and apparatus according to the invention, wherein a pull is exerted on the part being separated simultaneously with the application of ultrasonic vibrations.

FIG. 9 is a representation of a different apparatus and method for simultaneously exerting a pull on the joined part.

FIG. 10 is a representation of a still different method and apparatus for simultaneously vibrating and pulling on a work part.

FIG. 11 is a representation of the method and apparatus, wherein the vibrations are applied to an edge of a panel-like workpiece.

Figure 12:
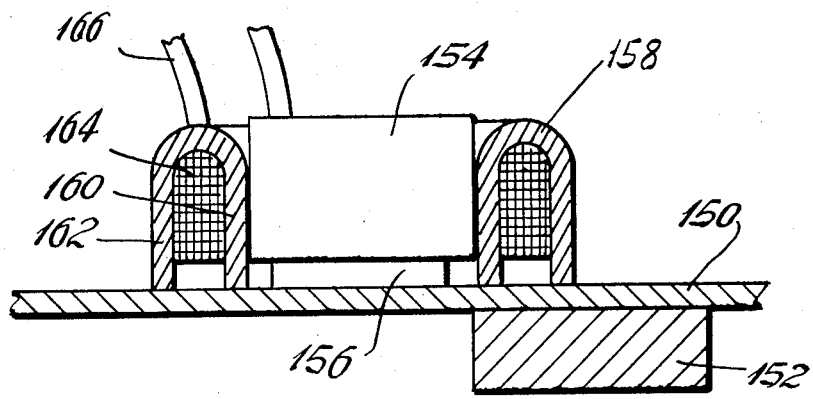
FIG. 12 is a diagrammatic representation of a transducer and pulling electromagnet.

Referring first to FIG. 1, the diagrammatic showing reveals an ultrasonic electric wave generator 20 and an electroacoustic transducer 22 connected by a transmission cable 24 whereby the electrical energy from the generator 20 is brought to the transducer and converted into elastic sound waves of substantially ultrasonic frequency, having a period generally above 15 kilocycles (15,000 hertz or 15 kilohertz). The ultrasonic waves from the transducer 22 are of a character adapted to be propagated in gases, liquids or solids, as will be readily understood. Also, such waves are capable of producing an ultrasonic thermal action in the transmission materials and in materials which are subjected to the waves.

The workpieces which are glued or cemented together, and which are to be unglued or separated by means of the ultrasonic energy comprise a member 26 shown as having the form of a block or rectangular body of significant mass, to which there is cemented or glued a structural member 28 shown as having the configuration of a channel, with a central web portion 30 and side flange portions 32. As seen in the figure, the web portion 30 of the member 28 is attached to the member 26 by glue or cement 34, which may be of epoxy or other plastic composition, or else ceramic cement, or glue of different composition or make-up.

The transducer 22 has an active or output face portion or armature 36 which is adapted to be brought into contact with the work so as to impart ultrasonic vibrations thereto. As seen in FIG. 1, the armature or face surface 36 is brought into engagement with the web portion 30 of the work member 28. It will be readily seen that the mass of the member 28 is considerably less than the mass of the work member 26, this being preferred inasmuch as the lesser mass will enable the lighter or smaller work member to respond more readily to the ultrasonic vibrations.

With the transducer 22 positioned against the workpiece 28, the generator 20 is turned on, whereupon the workpiece 26 will be subjected to ultrasonic vibrations from the transducer. Such ultrasonic vibrations will permeate the workpiece 28 and tend to also pass into the workpiece 26 through the glued joint 34. As at present understood, by virtue of the different masses of the workpieces 28, 26 and also since the transducer 22 is applied to only one of the workpieces, namely that having the channel-shape as indicated at 28, the cemented or glued joint is called upon to transmit the vibrations from the piece 28 to the piece 26, and in so doing the glued joint is subjected to severe vibrational stresses as well as to a certain amount of ultrasonic thermal action. In consequence, there is a great tendency for failure to occur of the structure of the cemented or glued joint, and such joint will quickly fail under the load imposed upon it, i.e., that of transmitting the ultrasonic vibrations from one workpiece to the other in conjunction with any thermal effect of the ultrasonic vibrations. The failure of the joint can occur rapidly, and the workpieces 26, 28 will separate without appreciable damage or deformation of the same, whereas the glued or cemented joint 34 will have deteriorated to a very considerable extent, this being the cause of its failure.

It will be understood that the arrangement illustrated in FIG. 1 involves direct physical contact between the transducer 22 and the workpiece, whereby the ultrasonic vibrations from the transducer are directly transmitted to one part of the work by means of intimate direct physical contact. It is preferred to apply the transducer to the workpiece which has the smallest mass or weight, whereby there is offered less resistance to the applied vibrations, in consequence of which the glued or cemented joint can be subjected to a greater intensity of vibration than if the workpiece itself had a relatively large mass.

FIG. 2 illustrates an organization comprising a wall member 40 of appreciable mass, to which there has been cemented or glued a relatively thin panel-like member 42. The transducer 22 is applied to the thin, panel-like member in the manner indicated, involving direct intimate physical contact. The ultrasonic vibrations imparted to the panel-like member 42 will tend to be transmitted to the wall member 40 of relatively large mass through the intermediary of the glued or cemented joint, and in consequence of this the joint will be placed under severe load, and will shortly fail, due to the severe mechanical stress as well as any ultrasonic thermal action which may be present in the glue or cement. It will be found that the glued joint deteriorates to such an extent that the panel member 42 readily separates from the wall member 40.

Another organization involving the present improved ultrasonic ungluing or disruption of a glued joint is illustrated in FIG. 3, wherein an automobile body 44 has attached to it by gluing a fender 46, shown as being in damaged condition. Transducers 22 can be applied to the damaged fender 46 at various locations in the manner indicated in the figure, whereupon the glued or cemented joint will be caused to fail, enabling the fender 46 to be readily removed from the vehicle body 44.

Another embodiment of the invention is illustrated in FIGS. 4 and 5 wherein workpieces 48, 50 are secured together by a glued joint 52, the workpiece 50 being at a location which is relatively inaccessible. An electroacoustic transducer 54 has provided on it an extension piece 56 having a generally Y-shaped cross section as seen in FIG. 5, said extension piece being brought into engagement with the workpiece 50 to apply ultrasonic vibrations thereto. The extension 56 has an impact-resistant tip portion 58 which may be constituted of a material especially chosen for high impact strength. Such material may be of plastic make-up or of metal, and is preferably readily removable from the extension 56 for replacement after serving a useful life.

The ultrasonic vibrations from the transducer 54 are transmitted to the workpiece 50, and will quickly cause failure of the cemented or glued joint 52, as will now be understood.

An organization for effecting ungluing of workpieces of non-uniform configuration is illustrated in FIG. 6. Here a thin panel-like workpiece 60 is glued or cemented to structural members 62, 64, 66 by epoxy or other suitable glue or cement. A tank 68 has a flexible bottom diaphragm 70 of rubber, plastic or other suitable composition, secured in place by an encircling band 72. In the tank 70 there is a liquid, such as water for example, indicated at 74. The transducer 76 has its working face 78 immersed in the bath 74 with the tank in place against the workpiece 60. It will be noted that the flexible bottom or diaphragm 70 of the tank will tend to assume the configuration of the workpiece 60. When the transducer 66 is energized, the ultrasonic vibrations therefrom will be transmitted to the liquid 74 and in turn to the diaphragm 70 and workpiece 60, subjecting the latter to high intensity ultrasonic vibrations and causing an ungluing or failure of the joint between the workpiece 60 on the one hand and the supporting members 62, 64, 66 on the other hand. It will be understood that in FIG. 6 the ultrasonic vibrations are transmitted to the workpiece through a liquid medium comprising the bath 74.

In FIG. 7 there is shown an arrangement whereby ultrasonic vibrations are transmitted to the workpiece through a trapped column of air. In this figure, a panel-like workpiece 80 is shown as glued to supporting members 82, 84. The transducer 86 has attached to its front face (or to its armature face) a heavy rubber or plastic hose 88 adapted at its remote end to engage the workpiece 80 and to trap a column of air between the latter and the working face of the transducer. When the transducer 86 is energized, the ultrasonic frequencies will be transmitted through the air column indicated at 90 and may also be transmitted through the heavy rubber hose 88 to the workpiece 80, effecting a loosening and failure of the glued joint between the latter and the support members 82, 84.

An arrangement whereby a transducer-type tool may be employed to impart a pull on the workpiece while simultaneously subjecting the latter to ultrasonic vibrations is illustrated in FIG. 8. Here, the workpiece 92 of panel-like configuration is shown as glued to support members 94, 96. The transducer 98 carries an encircling rubber skirt 100 which surrounds the working face or armature portion 102 of the transducer and is adapted to engage the workpiece 92 in sealing relation therewith. An air suction hose 104 is connected through the transducer case 98 to the space surrounded by the rubber skirt 100, as by means of a duct 106, whereby a suction may be created within the rubber skirt after it his been brought into sealing engagement with the workpiece 92. While such suction is acting, the transducer 98 is energized, subjecting the workpiece 92 to ultrasonic vibrations. At the same time a pull is exerted on the transducer, slightly weaker than the vacuum effect produced within the rubber skirt. Thus, as the glued joint is destroyed or disintegrated, the panel 92 will come away under the action of the pull that is being exerted and transferred to the panel.

Another embodiment of the invention is illustrated in FIG. 9, wherein there is shown a panel-like workpiece 108 cemented to a support member 110. The transducer 112 has an armature extension piece 114 provided with an impact-resistant shoe 116 arranged to engage the workpiece 108. Surrounding the extension 114 and shoe 116 is an off-set rubber suction cup 118 adapted to engage the workpiece 108. In operation, the transducer 112 is applied to the workpiece to bring the edges of the rubber suction cup 118 in intimate engagement with the panel 108. A slight compression of the rubber suction cup is made to occur prior to intimate engagement between the impact shoe 116 of the extension 114 and the panel 108. Upon such latter engagement occurring, the transducer 112 is tilted slightly in a clockwise direction as viewed, in FIG. 9. This will enable the impact shoe 116 to remain in engagement with the panel 108 while at the same time a suction is created within the cup 118 enabling a pulling force to be exerted on the panel 108 as it is subjected to the ultrasonic vibrations. When the cemented joint crumbles or fails, the pull will cause the panel 108 to separate from the support piece 110.

Yet another embodiment of the invention is illustrated in FIG. 10, wherein a panel 120 is shown as glued to a support metal 122. The transducer 124 has its armature or face portion 126 terminating in an apertured lug 128 which is pin-connected to a pair of pivoted arms 130, 132, the latter being pivotally connected to apertured lugs or ears 134 of a rubber suction cup 136 that is adapted to engage the panel 120 in a generally circular area located within the curved arms 130, 132. The extremities of the arms 130, 132 engage the panel 120 when a pull is exerted on the transducer, such pull tending to swing the pivoted arms into such engagement and at the same time tending to create a vacuum within the rubber suction cup 136. Thus, there is simultaneously applied ultrasonic vibrations to the panel 120 while a pull is being exerted on the panel by means of the suction cup 136. As the glued joint fails, the panel 120 will come away from the support member 122 under the action of the exerted pull.

FIG. 11 illustrates the application of an electroacoustic transducer 22 to one edge portion 140 of a panel-like member 142 which is cemented to a wall or other structural member 144. Ultrasonic vibrations imparted to the edge portion 140 of the panel 142 will effect a failure of the cemented joint, indicated at 146, whereupon the panel 142 will separate from its support 144 and may be readily removed.

Another embodiment of the invention is illustrated in FIG. 12, wherein a transducer and pulling electromagnet are combined, to effect loosening of the cemented or glued joint and separation of the joined parts In this figure a panel 150 of magnetic material such as steel is shown as glued to a support 152. The transducer 154 has its armature face 156 engaged with the panel. Surrounding and attached to the transducer is an annular electromagnet 158 comprising annular pole sections 160, 162 and an annular coil 164 supplied by leads 166. The pole sections engage the panel whereby the magnetic circuit is completed, enabling a strong pull to be exerted on the panel when pulling force is applied to the transducer. Thus a combination action is had, to loosen and remove the panel.

Figure 13:
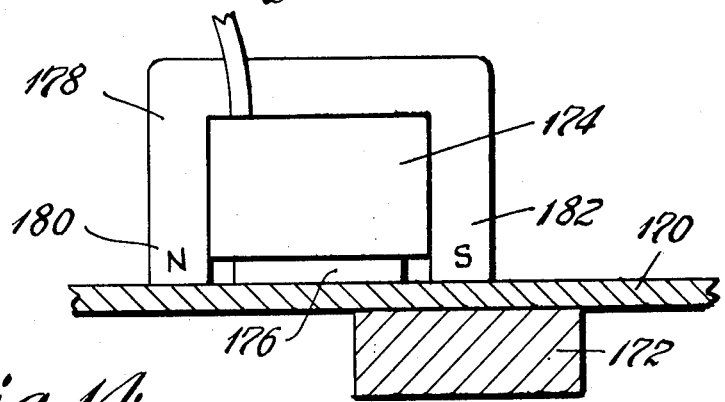
FIG. 13 is a representation of a transducer and pulling permanent magnet.

In FIG. 13 a steel panel 170 glued to a support 172 is subjected to a transducer 174 carrying a permanent magnet 178 having poles 180, 182, to effect an action similar to that in FIG. 12.

Figure 14:
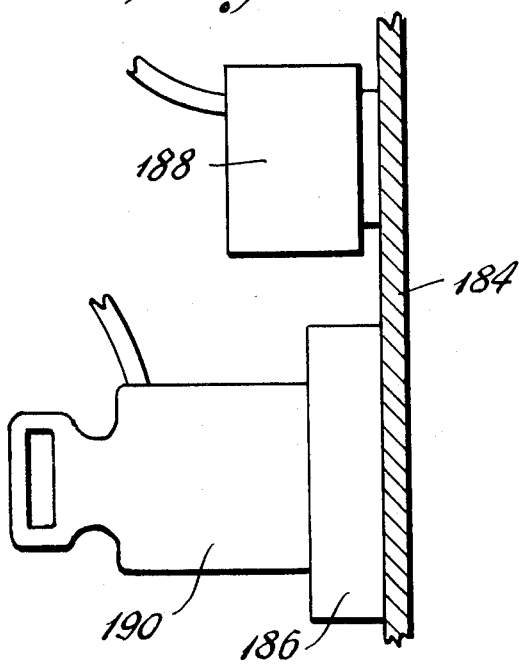
FIG. 14 is a representation showing a pulling magnet and transducer applied to different workpieces.

FIG. 14 shows a thin panel 184 glued to a steel or iron support block 186. The transducer 188 is applied to the panel 184, whereas the magnet 190 is applied to the steel support 186. Thus one of the glued pieces is vibrated while the pull is applied to the other glued piece.

It will now be understood from the foregoing that I have provided a novel and improved method and apparatus for ungluing glued or cemented members which are attached to each other by epoxy cement, various types of glue or cement, such detachment occurring generally without damage to the work parts which are being separated. The method and apparatus are seen to be especially simple and effective, and capable of application to a wide variety of conditions and structures.

Variations and modifications are possible, and portions of the improvement may be used without others.

I claim:

1. A device for loosening glued joints between two glued members, comprising in combination:
   a. an electroacoustic transducer having an armature output member, and
   b. an elongate, relatively slender extension attached to said output member,
   c. said extension having a cross-sectional configuration providing a plurality of longitudinally extending ribs separated by a plurality of longitudinally extending spaces to lighten its mass while retaining rigidity.

2. A device for loosening glued joints between two glued members, comprising in combination:
   a. an electroacoustic transducer having an armature output member, and
   b. a hollow resilient connector member connected to the transducer and having portions adjacent said armature output member.

3. A device as in claim 2, wherein:
   a. the resilient connector member comprises a tube having its bore at one end juxtaposed to said armature output member.

4. A device as in claim 3, and further including: a) means providing a duct for introducing a vacuum in said tube.

5. A device as in claim 2, wherein:
   a. the resilient connector member comprises a suction cup adapted to engage and apply suction to one of said glued members.

6. A device as in claim 5, and further including:

a. an extension connected with the armature output member and extending through said suction cup for engagement with said one glued member.

7. A device as in claim 5, and further including:
a. extensions connected with said armature output member and extending exteriorly of said suction cup for engagement with said one glued member.

8. A device as in claim 7, wherein:
a. the suction cup is pivotally connected to said extensions,
b. said extensions being pivotally connected to said armature output member to swing them toward said one glued member when the suction cup is urged in a direction away from the armature output member.

9. A device for loosening glued joints between two glued members, comprising in combination:
a. a tank having a flexible, diaphragm-like bottom wall adapted to be placed against one of said glued members and to conform to the contour thereof,
b. said tank having a quantity of liquid resting on said bottom wall, and
c. an electroacoustic transducer disposed in the liquid of the tank for imparting ultrasonic vibrations to the same and to the flexible tank bottom wall, thereby to have said vibrations imparted to said one glued member.

* * * * *